US012769038B2

(12) United States Patent
Jeon et al.

(10) Patent No.: US 12,769,038 B2
(45) Date of Patent: Oct. 20, 2026

(54) THIN-FILM STRUCTURES FOR OPTICAL APPLICATIONS COMPRISING FLUORIDE MIXTURES

(71) Applicant: California Institute of Technology, Pasadena, CA (US)

(72) Inventors: Taeyoon Jeon, Pasadena, CA (US); Axel Scherer, Barnard, VT (US); Jack Jewell, Boulder, CO (US)

(73) Assignee: California Institute of Technology, Pasadena, CA (US)

(*) Notice: Subject to any disclaimer, the term of this patent is extended or adjusted under 35 U.S.C. 154(b) by 863 days.

(21) Appl. No.: 18/091,221

(22) Filed: Dec. 29, 2022

(65) Prior Publication Data

US 2023/0258848 A1 Aug. 17, 2023

Related U.S. Application Data

(60) Provisional application No. 63/309,098, filed on Feb. 11, 2022.

(51) Int. Cl.
*G02B 5/08* (2006.01)
*G02B 1/113* (2015.01)

(52) U.S. Cl.
CPC ............ *G02B 5/0875* (2013.01); *G02B 1/113* (2013.01); *G02B 5/0883* (2013.01)

(58) Field of Classification Search
CPC .... G02B 5/0875; G02B 5/0883; G02B 1/113; G02B 5/281; G02B 5/282; G02B 5/288
USPC ....... 359/359, 360, 584, 586, 589, 839, 850, 359/884; 372/99
See application file for complete search history.

(56) References Cited

U.S. PATENT DOCUMENTS

| | | | | |
|---|---|---|---|---|
| 5,262,196 | A * | 11/1993 | Colton | G02B 1/113 427/164 |
| 8,749,881 | B2 * | 6/2014 | Banerjee | G02B 5/0833 359/359 |
| 9,229,140 | B2 * | 1/2016 | Banerjee | G02B 5/282 |
| 10,295,707 | B2 | 5/2019 | Cox et al. | |
| 2007/0006663 | A1 | 1/2007 | Zerwekh et al. | |
| 2009/0141358 | A1 * | 6/2009 | Cangemi | G02B 5/285 359/586 |
| 2014/0247481 | A1 * | 9/2014 | Fasold | G02B 5/0891 359/359 |
| 2016/0320534 | A1 | 11/2016 | Dodson et al. | |
| 2019/0011618 | A1 | 1/2019 | Delst et al. | |
| 2019/0044304 | A1 | 2/2019 | Jayaraman et al. | |

(Continued)

FOREIGN PATENT DOCUMENTS

| | | | |
|---|---|---|---|
| RU | 2091826 | C1 | 9/1997 |
| WO | 2014/188857 | A1 | 11/2014 |

OTHER PUBLICATIONS

Authorized Officer Kari Rodriguez, International Search Report and Written Opinion issued in PCT Patent Application No. PCT/US2022/054396 mailed on Aug. 10, 2023.

(Continued)

*Primary Examiner* — Jennifer D. Carruth
(74) *Attorney, Agent, or Firm* — Kaplan Breyer Schwarz, LLP

(57) ABSTRACT

An optical-thin-film structure comprises a low-index optical thin film consisting essentially of co-deposited Barium Fluoride and a secondary fluoride compound, and a high-index optical thin film.

25 Claims, 5 Drawing Sheets

(56) References Cited

U.S. PATENT DOCUMENTS

2020/0189964 A1 6/2020 Matsushita et al.

OTHER PUBLICATIONS

Gill et al, Ge/BaF2 thin-films for surface micromachined mid-wave and long-wave infrared reflectors, Jan. 4, 2022, Journal of Optical Microsystems, vol. 2, Issue 1.
Extended European Search Report received in related EP Patent Application No. 22926304.1 on Jan. 9, 2026.
Kotlikov et al, A study of BaxMg1—xF2 optical films, Mar. 13, 2014, Optics and Spectroscopy, pp. 381-385, vol. 117/No. 3.
Reginald et al., Dual-waveband optics for the visible and midwaveband infrared, Aug. 13, 1997, Society of Photo-Optical Instrumentation Engineers (SPIE), vol. 3061.
Yu et al., The coatings for a solar-rejected window of the infrared horizon sensor, Mar. 1, 2020, Infrared Physics & Technology, vol. 105.

* cited by examiner

THIN-FILM STRUCTURES FOR OPTICAL APPLICATIONS COMPRISING FLUORIDE MIXTURES

STATEMENT OF RELATED CASES

This specification claims priority of U.S. Pat. App. 63/309,098, filed Feb. 11, 2022 and which is incorporated by reference herein.

FIELD OF THE INVENTION

The present invention relates to optical-thin-film structures and methods for making them.

BACKGROUND

As is relevant for this specification, an "optical thin film" is a layer of material(s) having a thickness that is on the order of the coherence length of the light with which it interacts. Such optical thin films typically have a thickness within the range of a fraction of a nanometer to many micrometers.

Structures comprising plural optical thin films, and having appropriate characteristics, are useful for optical applications. A few examples of such optical-thin-film structures include mirrors, wavelength filters, anti-reflection coatings, and windows.

Optical-thin-film structures often comprise multiple layers of dielectric materials, typically alternating between those comprising materials having a relatively high refractive index and those having a relatively low refractive index. In the context of infrared (IR) wavelengths in the range between about 1.5 to about 20 microns ("mid-IR"), "low-index" materials/layers are those having a refractive index less than about 1.7, and "high-index" materials/layers are those having a refractive index of about 1.7 and greater.

The optical thin films composing such structures should be robust to temperature changes, mechanical shock, humidity, and other environmental factors. Moreover, the optical thin films of optical reflectors, filters, and windows must absorb no more than a minimal amount of light over a broad range of wavelengths.

For mid-IR applications, Silicon (Si), Germanium (Ge), ZnSe or ZnS often serve as the high-index material, meeting the various requirements referenced above.

In the past, Thorium Fluoride ($ThF_4$) was the preferred low-index material, but its radioactivity has limited its practical uses. Some other fluoride compounds that have low refractive index and exhibit relatively low absorption losses in the IR spectrum (e.g., $AlF_3$, $BaF_2$, $SrF_2$, NaF, LiF, $MgF_2$ and $CaF_2$, etc.) have been used as the low-index layer for certain optical applications.

Problems can arise, however, when attempting to produce high-quality, smooth, optical thin films. The most common problems limiting the use of certain fluoride compounds are: (a) environmental deterioration in humid environments and (b) the tendency to form crystalline layers having rough surfaces/interfaces, which result in losses due to light scattering.

Manufacturers have continued to struggle to produce optical-thin-film multilayer structures that include low-index materials for optical applications, especially for mid-IR wavelengths.

SUMMARY

The present invention provides optical-thin-film structures consisting essentially of fluorides as a low-index material, and methods for making such structures. In optical-thin-film structures in accordance with the illustrative embodiment, at least one low-index thin film consists essentially of a major amount (i.e., >50 weight percent) of Barium Fluoride ($BaF_2$) and a minor amount of one or more secondary fluoride compounds.

The secondary fluoride compounds suitable for use in conjunction with embodiments of the invention include those that: (1) reduce the average crystal size of a low-index optical thin film (relative to that of a low-index optical thin film consisting solely of Barium Fluoride), (2) have suitable optical properties for the particular optical application (e.g., refractive index, absorption losses, etc.), and (3) have suitable chemical stability. Fluoride compounds that satisfy requirements (1) through (3) above for a variety of optical applications include, without limitation: $CaF_2$, $AlF_3$, $YF_3$, $YbF_3$, $CeF_3$, $ThF_4$, NaF, LiF, KF, $SrF_2$, and $MgF_2$.

The amount of the secondary fluoride compound—which may include one or more suitable fluoride compounds—is typically in the range of about 1 to about 25 weight percent, as a function of: (1) the particular secondary fluoride compound used, (2) substrate temperature and the temperature of the deposited thin films, and (3) required film thickness, among any other parameters. More typically, the amount of the secondary fluoride will be in the range of about 1 to about 15 weight percent.

Optical-thin-film structures consistent with the present teachings are particularly well-suited for operation at infrared wavelengths in the range of about 1.5 to about 20 microns, and may be configured as an antireflection coating, a high-reflection coating, a long-wavelength-pass filter, a short-wavelength-pass filter, a wide-bandpass filter, and a narrow-bandpass filter, among any other optical devices.

Some embodiments in accordance with the present teachings provide an article comprising an optical-thin-film structure, wherein the optical-thin-film structure comprises alternating thin films of low-index material and high index material, the low-index material having a refractive index less than about 1.7, and the high-index material having a refractive index of at least about 1.7, wherein at least one of the thin films of low-index material consists essentially of a mixture of:

(a) Barium Fluoride in an amount within a range of about 75 to about 99 weight percent; and
(b) at least one secondary fluoride compound, wherein the secondary fluoride compound:
  (i) is suitable for reducing an average crystal size of the optical thin films of low-index material relative to an average crystal size of a low-index optical thin film consisting of 100 percent by weight of Barium Fluoride; and
  (ii) possesses suitable optical properties and chemical stability for the intended use of the article.

Some other embodiments in accordance with the present teachings provide a method comprising forming a low-index optical thin film by co-evaporating Barium fluoride and a secondary fluoride compound on to a first surface; and forming a high-index optical thin film on the low-index optical thin film.

DETAILED DESCRIPTION

Figure 1A:
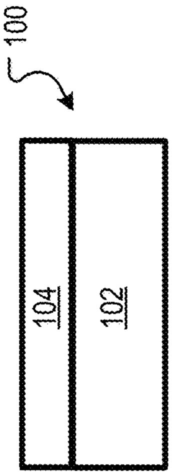
FIG. 1A depicts an embodiment of an optical-thin-film structure in accordance with the illustrative embodiment of the invention.

FIG. 1A depicts optical-thin-film structure 100 in accordance with the illustrative embodiment of the present invention. Structure 100 consists of layer 102 and layer 104.

Layer 102 is a low-index optical thin film consisting essentially of a mixture of Barium Fluoride and one or more other "secondary" fluoride compounds. Layer 104 is a high-index optical thin film, which typically consists of one of Ge, Si, ZnS, or ZnSe.

It is notable that the refractive index of Barium fluoride at 10 microns is about 1.41, and is 1.352 at 14 microns. Moreover, Barium fluoride exhibits low absorption losses over a wide spectral range up to 15 microns (extinction coefficient k=0.0004 at 10 um and k=0.001277 at 14 um). In addition, Barium fluoride is physically hard, and does not easily absorb moisture from the air compared to other fluoride compounds. These properties make Barium fluoride particularly attractive as a candidate for use as the low-index material in optical-thin-film structures for mid-IR applications.

Thin-film deposition of Barium fluoride can be accomplished, for example, by thermal evaporation, electron-beam (E-beam) evaporation, or by using a sputter deposition process in which ions are accelerated onto a Barium fluoride target. When thermal evaporation is used, fluoride deposition rates of over 2 nm/sec can be achieved, and the thin films of multi-layer mirrors can be deposited accurately if a quartz crystal oscillator monitor is used to measure the thickness of the films.

However, a problem arises when depositing Barium fluoride for use in an optical-thin-film structure. In particular, the surface of the deposited Barium fluoride film becomes increasingly rough with (increasing) film thickness, which results in light-scattering losses in the resulting optical structures. This is a consequence of the crystal structure of Barium fluoride, the growth of which generates this roughness.

The present inventors discovered that co-depositing (such as by co-evaporating) one or more secondary fluoride compounds with the Barium fluoride results in a smoother optical thin film. The co-deposition of the secondary fluoride compound reduces the average crystal size in the resulting optical thin film (relative to what it would have been had the optical thin film consisted of 100 percent Barium fluoride). Importantly, the co-deposition can be performed without substantially compromising the refractive index or adhesion properties of the resulting thin film.

In addition to reducing the average crystal size in the deposited thin-film, it is believed that co-deposition of Barium fluoride with other fluoride compounds reduces the grain size of the Barium fluoride. This is because during co-deposition, defects in the crystal structure of Barium fluoride arise due to a difference in crystal shape or a mismatch of lattice constants between Barium fluoride and the secondary fluoride.

As to crystal shape, $YF_3$, for example, has an orthorhombic Pnma space group that is different from that of Barium fluoride. And regarding lattice mismatch, the $BaF_2$ crystal has a lattice constant of 0.62 nm, whereas the $CaF_2$ crystal has a lattice constant of 0.54 nm. In fact, since all other fluorides compounds have a different crystal structure and/or lattice constant than $BaF_2$, they are all suitable for causing defects in the crystal structure of $BaF_2$ and are expected to result in an optical thin film having a smoother surface than $BaF_2$ alone. Expectations aside, surface smoothness is readily determined by simple experimentation.

As a consequence, the usefulness of such secondary fluoride compounds as co-deposition partners for Barium fluoride may ultimately be a function of suitability of the optical properties of such compounds for the optical application of interest (e.g., IR absorption losses in the wavelength region of interest, etc.) Additionally, the secondary fluorides must possess adequate chemical stability. And of course, even if a particular fluoride compound is otherwise suitable based on the aforementioned characteristics, its cost, availability, and/or difficulty of synthesis may remove it from consideration.

Optical thin films have been formed in which Barium fluoride was co-deposited via co-evaporation with (on an individual basis): $YF_3$, $YbF_3$, $AlF_3$, $CeF_3$, $CaF_2$, and $ThF_4$. The resulting optical thin films demonstrated significantly smoother interfaces than pure Barium fluoride films. The results of such experimentation are discussed below for $CaF_2$, $AlF_3$, $YF_3$, and $YbF_3$.

FIGS. 2B through 2F are micrographs of respective low-index optical thin films 102B through 102F consisting of Barium fluoride and another fluoride compound, co-deposited in accordance with the present teachings. A thin layer of germanium (identified as layer 104B through 104F in the figures) was deposited on the surface of the low-index thin film to image surface roughness more clearly. Germanium was deposited via sputtering, but any of a variety of techniques known to those skilled in the art may suitably be used.

Table I shows the composition of the low-index layer for FIGS. 2A through 2F.

TABLE I

Low-Index Optical-Thin-Film Composition

| FIG. No. | Composition | Concentration of $BaF_2$:Secondary Fluorides <Wt Percent> |
|---|---|---|
| 2A | $BaF_2$ | 100:0 |
| 2B | $BaF_2$:$CaF_2$ | 95:5 |
| 2C | $BaF_2$:$AlF_3$ | 95:5 |
| 2D | $BaF_2$:$YF_3$ | 95:5 |
| 2E | $BaF_2$:$YbF_3$ | 95:5 |
| 2F | $BaF_2$:$YbF_3$ | 85:15 |

Figure 2A:
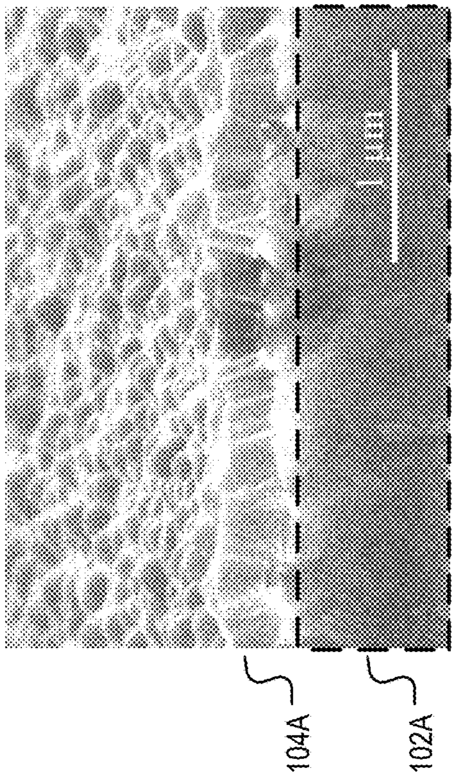
FIG. 2A Prior Art
FIG. 2A is a micrograph showing a conventional optical thin film of $BaF_2$.
Figure 2B:
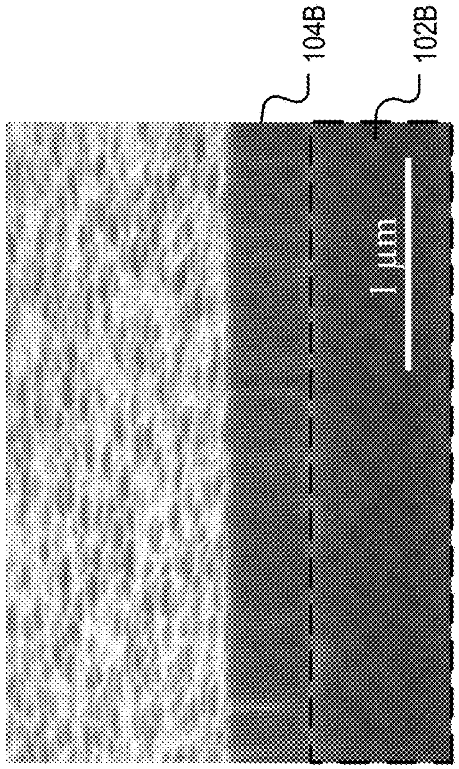
FIG. 2B is a micrograph showing an optical thin film in accordance with the present teachings, wherein the optical thin film consists of $BaF_2$ and $CaF_2$ (95/5 weight percent, respectively).
Figure 2C:
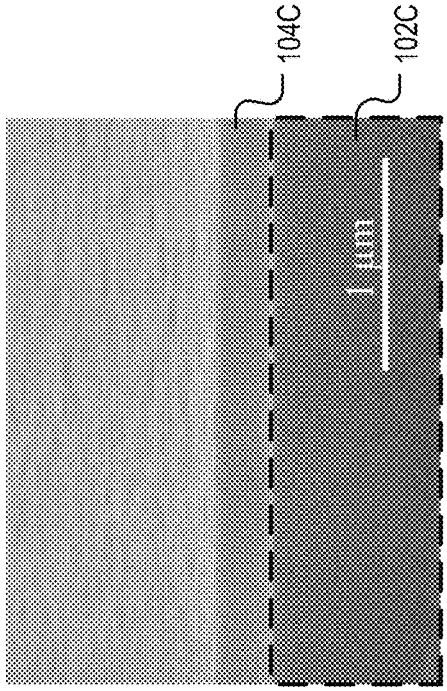
FIG. 2C is a micrograph showing an optical thin film in accordance with the present teachings, wherein the optical thin film consists of $BaF_2$ and $AlF_3$ (95/5 weight percent, respectively).
Figure 2D:
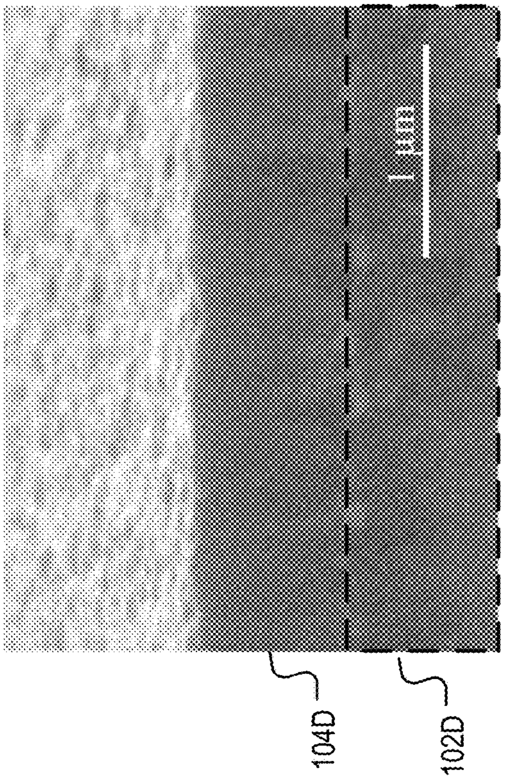
FIG. 2D is a micrograph showing an optical thin film in accordance with the present teachings, wherein the optical thin film consists of $BaF_2$ and $YF_3$ (95/5 weight percent, respectively) and a layer of Germanium.
Figure 2E:
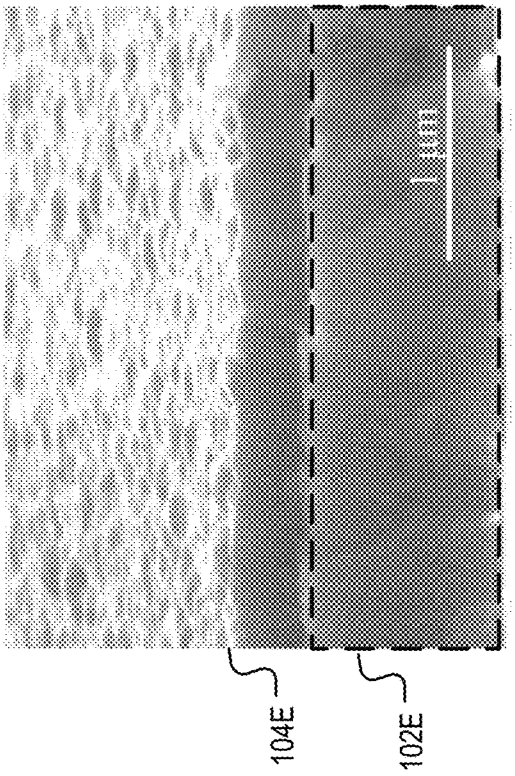
FIG. 2E is a micrograph showing an optical thin film in accordance with the present teachings, wherein the optical thin film consists of $BaF_2$ and $YbF_3$ (95/5 weight percent, respectively).
Figure 2F:
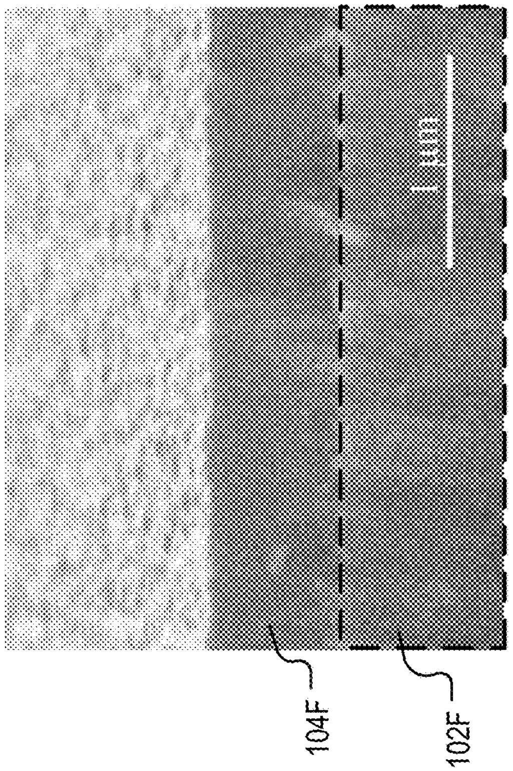
FIG. 2F is a micrograph showing an optical thin film in accordance with the present teachings, wherein the optical thin film consists of $BaF_2$ and $YbF_3$ (85/15 weight percent, respectively).

For FIG. 2A, low-index optical thin film 102A consists solely of Barium fluoride, and serves as a comparative example. Layer 104A is germanium. Comparing the upper surface of layer 104A to the upper surface of layers 104B through 104E (FIGS. 2B-2E) demonstrates that low-index optical thin films 102B through 102E, which include five percent of co-deposited fluoride compounds, exhibit relatively less surface roughness than optical thin film 102A of pure Barium fluoride.

FIGS. 2B through 2E demonstrate that the smoothness of the optical thin film is a function (among other parameters) of the particular fluoride compound that is co-deposited with Barium fluoride. In particular, co-deposited mixtures containing five weight percent of $CaF_2$ (FIG. 2B) or $YbF_3$ (FIG. 2E) result in a notable decrease in surface roughness. Co-deposited mixtures containing five weight percent of $Yb_3$ (FIG. 2D) result in even less surface roughness than $CaF_2$ or $YbF_3$ mixtures. And $AlF_3$ (FIG. 2C) results in a greatly diminished surface roughness, showing the best performance at five weight percent of the secondary fluorides tested.

The smoothness of the low-index optical thin film is also a function of the amount of the secondary fluoride compound(s) that is co-deposited with the Barium fluoride. This can be seen, for example, by comparing FIG. 2E (five weight percent $YbF_3$) with FIG. 2F (fifteen weight percent $YbF_3$), wherein the higher concentration of $YbF_3$ results in a smoother optical thin film.

Temperature also plays a role in controlling the roughness of an optical thin film. Cooling of the deposited optical thin films (and the substrate upon which they are deposited) may reduce grain size, thereby improving the smoothness of the deposited optical thin films. Conversely, heating typically generates larger grains and more roughness. When depositing "thin" optical thin films (<0.5 microns) on to substrates at room temperature, it is typically not necessary to control temperature. However, depositing "thick" optical thin films (≥0.5 microns), such as for infrared mirrors and filters, increases the substrate temperature due to radiative heating from the hot evaporation source. This necessitates temperature control, either via active cooling of the substrate during deposition, or by pausing growth during the optical-thin-film deposition process, thereby enabling the materials to cool passively. The substrate temperature should be limited to no more than 100° C. Preferably, the substrate temperature is maintained at less than 50° C., and more preferably at 25° C. or less. Either form (active or passive) of temperature control is important reducing surface roughness as well as strain in an optical-thin-film structure.

To compensate for relatively higher temperatures during deposition, the concentration of the secondary fluoride can be increased. But because many of the secondary fluorides have higher IR absorption than Barium fluoride at wavelengths of interest, it is generally preferable to keep their concentration relatively low, such as 15 weight percent or less, notwithstanding the prospect of further improvements in the smoothness of the optical thin films at higher concentrations.

Figure 1B:
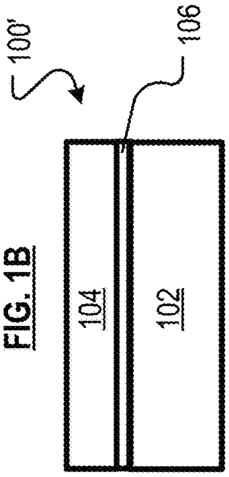
FIG. 1B depicts an alternative embodiment of an optical-thin-film structure in accordance with the illustrative embodiment of the invention.

A further consideration when depositing fluoride optical thin films, particularly in relatively thick multi-layer structures having high-index optical thin films consisting of Germanium or Silicon, is poor adhesion of the (dissimilar) optical thin films to one another due to stress. This stress increases with increasing thickness of the optical thin film, often resulting from the differing coefficients of thermal expansion of the constituents of the multi-layer structure. To mitigate the stress build-up and poor interface adhesion, adhesion-assisting layers have traditionally been included between the high-index and low-index optical thin films. Such a layer is depicted in optical-thin-film optical structure 100' of FIG. 1B as thin layer 106.

In summary, secondary fluoride compounds suitable for use in conjunction with embodiments of the invention include those that: (1) reduce the average crystal size of a low-index optical thin film (relative to that of a low-index optical thin film consisting solely of Barium Fluoride), (2) have suitable optical properties for the particular optical application, and (3) have suitable chemical stability. Fluoride compounds that satisfy requirements (1) through (3) above for a variety of optical applications include, without limitation: $CaF_2$, $AlF_3$, $YF_3$, $YbF_3$, $CeF_3$, $ThF_4$, NaF, LiF, KF, $SrF_2$, and $MgF_2$.

In accordance with the present teachings, stress mitigation and interface adhesion may be improved via the following techniques.

In some embodiments, a surface treatment, such as ion bombardment or the like is used to improve the adhesion between optical thin films of a multi-layer optical-thin-film structure. In particular, at each interface between hi-index and low-index optical thin films, the surface is cleaned with Argon via ion beam, DC glow discharge, or RF glow discharge. Such bombardment cleans the surface of a deposited optical thin film to: (a) remove any contamination that might accumulate during the transition from one deposition step to the next, and (b) promote covalent bonding between the high-index material (e.g., Ge, Si, etc.) and the low-index fluoride-containing thin films. Using this technique, the thickness of any adhesion-assisting layers may be reduced below 5 nanometers, or these layers may be completely eliminated. Ion bombardment has been shown to prevent delamination of the optical thin films and result in a more robust and durable optical-thin-film structure. In some embodiments, a different surface treatment (e.g., laser ablation, desorption, etc.) is used to improve the adhesion between at least two of the optical thin films of a multi-layer optical-thin-film structure.

Exemplary Optical-Thin-Film Structures. FIGS. 3, 4A-4C, and 5 depict illustrative embodiments of optical-thin-film structures in accordance with the present teachings. For these illustrative embodiments, the secondary fluoride is $AlF_3$ in an amount of 5 weight percent in the low-index optical thin film ($BaF_2$ at 95 weight percent), and the high-index optical-thin-films are Germanium. If present, the substrate is Silicon. In some alternative embodiments of these structures, one or more different secondary fluoride compounds may suitably be used, such as $CaF_2$, $YF_3$, $YbF_3$, $CeF_3$, $ThF_4$, NaF, LiF, KF, $SrF_2$, and $MgF_2$, or any other fluoride compounds that satisfy the requirements previously discussed (i.e., reduce average crystal size of a Barium fluoride optical thin film, suitable optical properties, and chemical stability). The amount of such different secondary fluoride compounds in the low-index optical thin film may vary based on previously discussed considerations (e.g., absorption, etc.). And/or a different material may be used as the substrate, such as glass, Ge, sapphire, or any other material commonly used as a substrate for optical devices. And/or a different material may be used as the high-index optical thin film, such as Silicon, Zinc Sulfide, or Zinc Selenide, etc.

Figure 3:
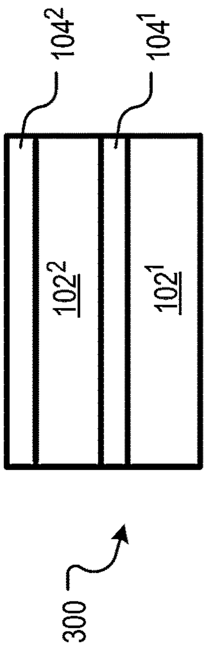
FIG. 3 depicts an embodiment of an optical-thin-film structure in accordance with the present teachings, wherein the optical-thin-film structure is a Bragg mirror.

FIG. 3 depicts optical-thin-film structure 300 in accordance with an illustrative embodiment of the invention. Structure 300 is a partially reflective mirror (i.e., a Bragg mirror) for mid-IR applications. In this particular embodiment, the partially reflective mirror has four optical thin films: $\mathbf{102}^1$, $\mathbf{104}^1$, $\mathbf{102}^2$, and $\mathbf{104}^2$. Optical thin films $\mathbf{102}^1$ and $\mathbf{102}^2$ are low-index optical thin films consisting of Barium fluoride and $AlF_3$. Optical thin films $\mathbf{104}^1$ and $\mathbf{104}^2$ are high-index optical thin films consisting of Germanium. The thickness of each optical thin film is $\lambda/4n$, where $\lambda$ is the wavelength of the IR and n is the refractive index of each particular optical thin film (commonly called "quarter-wave" layers or films). It is notable that the thicknesses depicted for the optical thin films are not to scale; the differences shown are for the purpose of readily distinguishing low- and high-index optical thin films from one another.

Figure 4A:
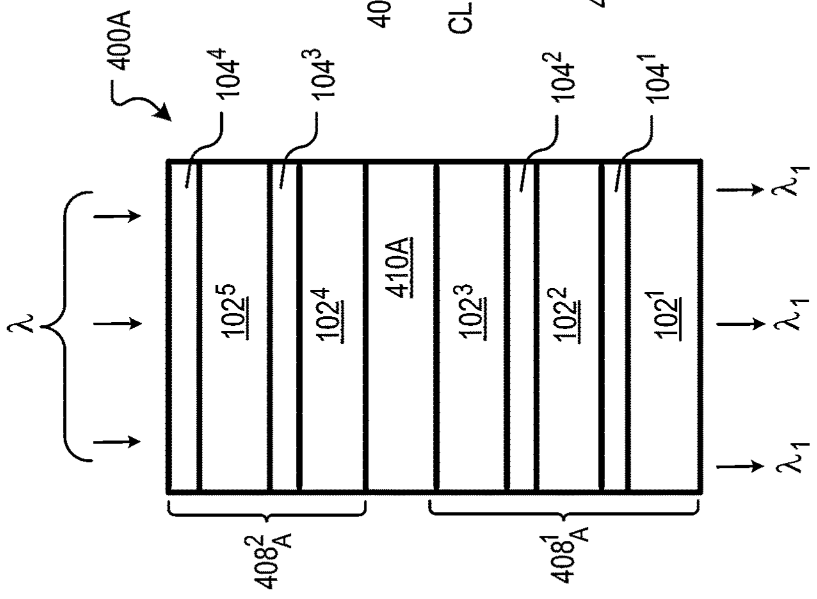
FIG. 4A depicts an embodiment of an optical-thin-film structure in accordance with the present teachings, wherein the optical-thin-film structure is a first embodiment of an optical filter.
Figure 4B:
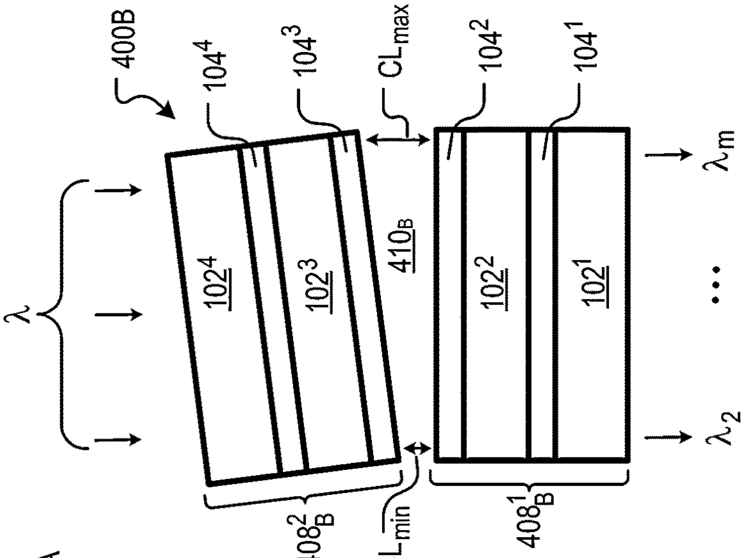
FIG. 4B depicts an embodiment of an optical-thin-film structure in accordance with the present teachings, wherein the optical-thin-film structure is a second embodiment of an optical filter.
Figure 4C:
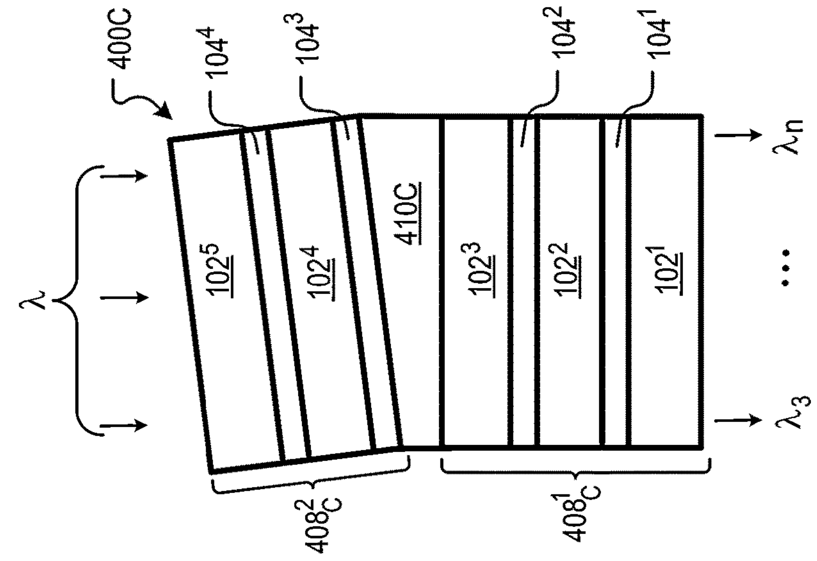
FIG. 4C depicts an embodiment of an optical-thin-film structure in accordance with the present teachings, wherein the optical-thin-film structure is a third embodiment of an optical filter.

Optical-thin-film structures 400A, 400B, and 400C in accordance with the present teachings, which are depicted in respective FIGS. 4A through 4C, function as mid-IR wavelength optical filters. These optical filters include two Bragg mirrors separated by an optically resonant cavity.

FIG. 4A depicts structure 400A, which is capable of filtering wavelengths in the mid-IR range and passing a single wavelength $\lambda_1$.

Optical-thin-film structure 400A includes first Bragg mirror $\mathbf{408}^1{}_A$ and second Bragg mirror $\mathbf{408}^2{}_A$ separated by optically resonant cavity 410A. Bragg mirror $\mathbf{408}^1{}_A$ includes five optical thin films: low-index optical thin films ($\mathbf{102}^1$, $\mathbf{102}^2$, and $\mathbf{102}^3$) and high-index optical thin films ($\mathbf{104}^1$ and $\mathbf{104}^2$), alternating as previously disclosed. Bragg mirror $\mathbf{408}^2{}_A$ includes four optical thin films: low-index optical thin films ($\mathbf{102}^4$ and $\mathbf{102}^5$) and high-index optical thin films ($\mathbf{104}^3$ and $\mathbf{104}^4$), alternating as previously disclosed. The low-index optical thin films consist of a co-deposited mixture of Barium Fluoride and $AlF_3$. The high-index optical thin films are Germanium. Optically resonant cavity 410A can be comprise any one of a number of high-index materials, such as fused silica, germanium, silicon, zinc selenide, yttrium aluminum garnet (YAG), etc. In some other embodiments, the optically resonant cavity can be other than a solid material, such as a liquid or gas, the latter of which may be under partial vacuum.

FIG. 4B depicts structure 400B, which is capable of filtering wavelengths in the mid-IR range and passing plural wavelengths $\lambda_2$ to $\lambda_m$.

Optical-thin-film structure 400B comprises first Bragg mirror $\mathbf{408}^1{}_B$ and second Bragg mirror $\mathbf{408}^2{}_B$, which are separated by optically resonant cavity 410B. Bragg mirror $\mathbf{408}^1{}_B$ includes four optical thin films: low-index optical thin films ($\mathbf{102}^1$ and $\mathbf{102}^2$) and high-index optical thin films ($\mathbf{104}^1$ and $\mathbf{104}^2$), alternating as previously disclosed. Bragg mirror $\mathbf{408}^2{}_B$ includes four optical thin films: low-index optical thin films ($\mathbf{102}^3$ and $\mathbf{102}^4$) and high-index optical thin films ($\mathbf{104}^3$ and $\mathbf{104}^4$), alternating as previously disclosed. The low-index optical thin films consist of a co-deposited mixture of Barium Fluoride and $AlF_3$. The high-index optical thin films are Germanium.

In structure 400B, the length of cavity 410B varies in a transverse direction, wherein, in FIG. 4B, cavity 410B has a minimum length $CL_{min}$ at the left side of optical filter 400B, and a maximum length $CL_{max}$ at the right side of the filter. As a consequence of this variation in cavity length, the wavelength of the light transmitted through filter 400B varies with transverse position. Optically resonant cavity 410B contains a gas, such as air, etc.

FIG. 4C depicts optical-thin-film structure 400C, which, like structure 400B, is capable of filtering wavelengths in the mid-IR range and passing plural wavelengths $\lambda_3$ to $\lambda_n$. In structure 400C, Bragg mirror $\mathbf{408}^1{}_C$ includes five optical thin films similar to structure 400A: low-index optical thin films ($\mathbf{102}^1$, $\mathbf{102}^2$, and $\mathbf{102}^3$) and high-index optical thin films ($\mathbf{104}^1$ and $\mathbf{104}^2$). And Bragg mirror $\mathbf{408}^2{}_C$ includes four optical thin films similar to structure 400A: low-index optical thin films ($\mathbf{102}^4$ and $\mathbf{102}^5$) and high-index optical thin films ($\mathbf{104}^3$ and $\mathbf{104}^4$). The low-index optical thin films consist of a co-deposited mixture of Barium Fluoride and $AlF_3$. The high-index optical thin films are Germanium.

As in optical-thin-film structure 400B, the length of cavity 410C varies in a transverse direction, wherein, in FIG. 4C, cavity 410B has a minimum length at the left side of optical filter and a maximum length at the right side of the filter. As a consequence of this variation in cavity length, the wavelength of the light transmitted through structure 400C varies with transverse position. Unlike optical-thin-film structure 400B, optically resonant cavity 410C of structure 400C comprises high-index material, such as the materials referenced for cavity 410A of FIG. 4A.

In the embodiments depicted in FIGS. 3 and 4A-4C, respective optical-thin-film structures 300, 400A, 400B, and 400C do not include any adhesion-assisting layers at the interface between low- and high-index optical thin films. In some other embodiments (not depicted), such optical-thin-film structures include such adhesion-assisting layers (e.g., see FIG. 1B).

Figure 5:
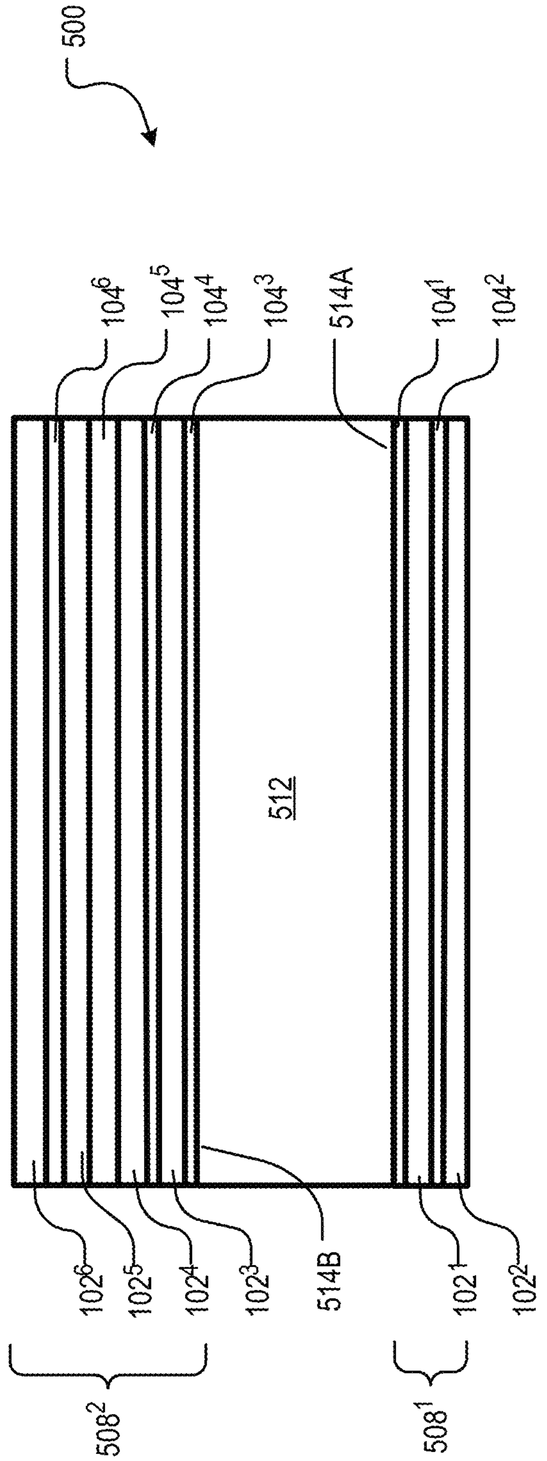
FIG. 5 depicts an embodiment of an optical-thin-film structure in accordance with the present teachings.

FIG. 5 depicts optical assembly 500, which includes first optical-thin-film structure $\mathbf{508}^1$ deposited on first surface 514A of substrate 512, and second optical-thin-film structure $\mathbf{508}^2$ deposited on second side 514B of the substrate.

First optical-thin-film structure $\mathbf{508}^1$ has four optical thin films: low-index optical thin films ($\mathbf{102}^1$ and $\mathbf{102}^2$) and high-index optical thin films ($\mathbf{104}^1$ and $\mathbf{104}^2$), alternating as previously disclosed. Second optical thin film structure $\mathbf{508}^2$ includes eight optical thin-films: low-index optical thin films ($\mathbf{102}^3$, $\mathbf{102}^4$, $\mathbf{102}^5$, and $\mathbf{102}^6$) and high-index optical thin films ($\mathbf{104}^3$, $\mathbf{104}^4$, $\mathbf{104}^5$, and $\mathbf{104}^6$), alternating as previously disclosed. In the illustrative embodiment, both first and second optical-thin-film structures $\mathbf{508}^1$ and $\mathbf{508}^2$ include at least some low-index optical thin films consisting essentially of Barium fluoride and $AlF_3$. And the substrate is Silicon, and the high-index optical thin film is Germanium.

As mentioned in conjunction with the discussion of Bragg reflectors, the various high-index and low-index optical thin films are nominally quarter-wave layers, except that in optical assembly 500, the fifth optical thin film $\mathbf{104}^5$ of structure $\mathbf{508}^2$ is a half-wave layer (i.e., thickness=$\lambda/2n$).

Optical assembly 500 functions as an optical filter of moderate quality factor Q and resolution.

Figure 6:
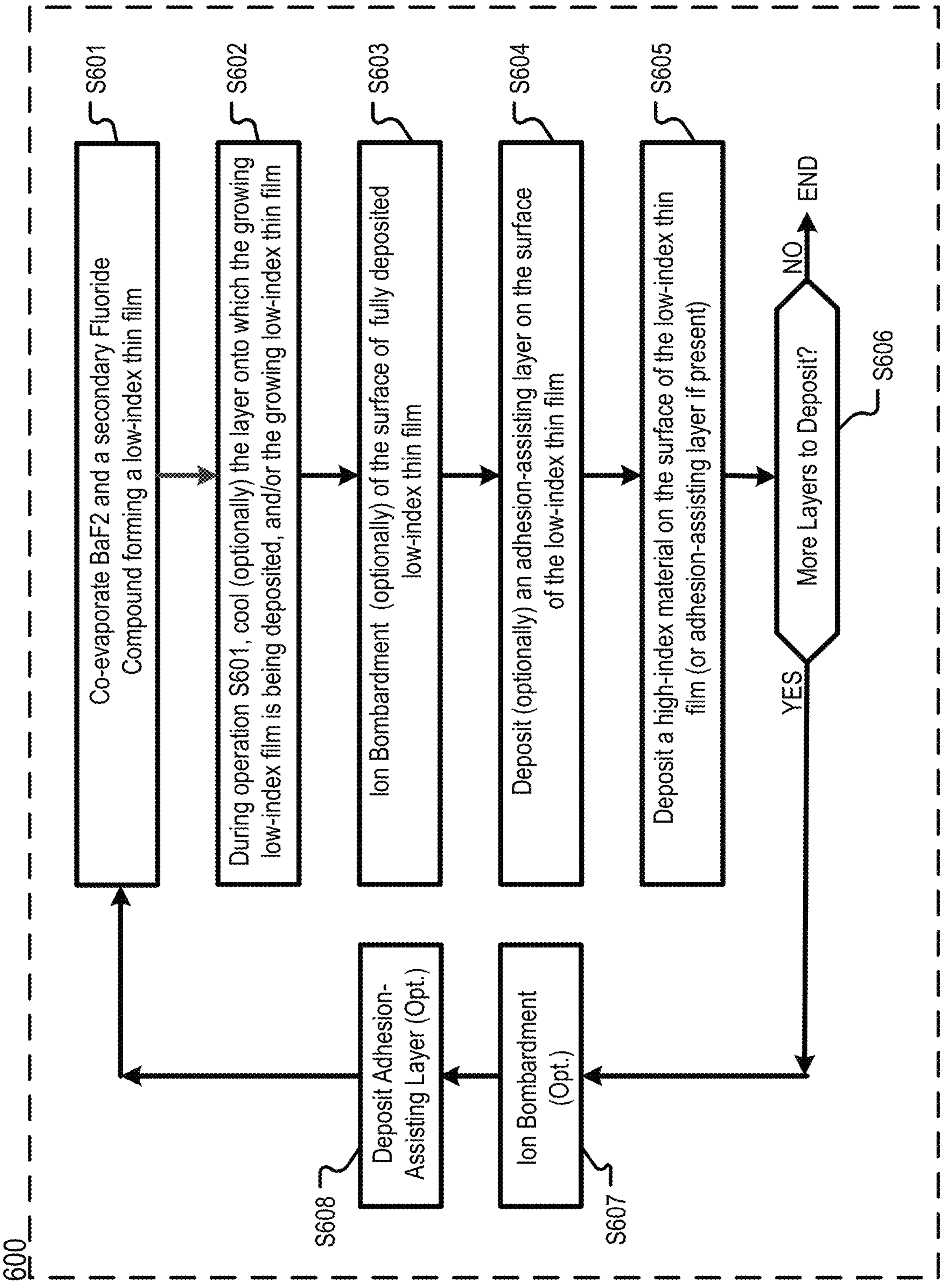
FIG. 6 depicts a flow diagram of a process for making an optical-thin-film structure in accordance with the present teachings.

FIG. 6 depicts a flow diagram of method 600 in accordance with an illustrative embodiment of the present invention. The details of the steps of the method have been described above. In step S601, Barium fluoride and a secondary fluoride compound are co-evaporated onto a surface (e.g., a substrate, an existing optical thin film, an adhesion-assisting layer, etc.). In optional step S602 (which, if conducted, is carried out during step S601), the substrate or optical thin film on to which the growing low-index optical thin film is being deposited is cooled, as is the growing optical thin film itself. In optional step S603, the surface of the deposited low-index optical thin film is surface treated, such as by ion bombardment. In optional step S604, an adhesion-assisting layer is deposited on the surface of the low-index optical thin film. In step S605, a high-index material is deposited on the surface of the low-index optical thin film (or on the adhesion-assisting layer, if present).

In step S606, query if more optical thin films are to be deposited. If "yes," then optionally perform steps S607 (ion bombardment) and S608 (deposit adhesion-assisting layer), and then loop back to step S601 to co-deposit a low-index optical thin film on to the just-deposited high-index optical thin film (or adhesion-assisting layer). As appropriate, in some alternative embodiments, the process can begin by depositing a high-index optical thin film, followed by the deposition of a low-index optical thin film.

In summary, an optical-thin-film structure, as depicted and described, comprises at least one low-index optical thin film consisting essentially of Barium fluoride and at least one secondary fluoride compound that reduces the average crystal size of a low-index thin film (relative to that of a low-index optical thin film consisting solely of Barium Fluoride), and at least one high-index optical thin film. Embodiments of an optical-thin-film optical structure in accordance with the present invention may further comprise at least one of the following features, in any (non-conflicting) combination, among other features disclosed herein:

- Wherein the secondary fluoride compounds are selected from the group consisting of $CaF_2$, $AlF_3$, $YF_3$, and $YbF_3$.
- Wherein the secondary fluoride compounds are selected from the group consisting of $CaF_2$, $AlF_3$, $YF_3$, $YbF_3$, $CeF_3$, $ThF_4$, NaF, LiF, KF, $SrF_2$, and $MgF_2$.
- Wherein refractive index of the low-index optical thin film is less than about 1.7.
- Wherein the refractive index of the high-index optical thin film is at least about 1.7.
- Wherein the amount of Barium fluoride in the low-index optical thin film is in a range of about 75 to about 99 weight percent.
- Wherein the amount of Barium fluoride in the low-index optical thin film is in a range of about 85 to about 99 weight percent.
- Wherein the low-index optical thin film consists essentially of $BaF_2$ in an amount of 95 percent by weight and $AlF_3$ in an amount of 5 percent by weight.
- Wherein the low-index optical thin film consists essentially of $BaF_2$ in an amount of 99 percent by weight and $AlF_3$ in an amount of 1 percent by weight.
- Wherein the low-index optical thin film consists essentially of $BaF_3$ in an amount in an amount in a range of about 85 to about 95 percent by weight, and $YbF_3$ in an amount in a range of about 5 to about 15 percent by weight.
- Wherein the high-index optical thin film comprises a material selected from the group consisting of Ge, Si, ZnS, or ZnSe.
- Wherein the optical-thin-film structure is selected from the group consisting of an antireflection coating, a high-reflection coating, a long-wavelength-pass filter, a short-wavelength-pass filter, a wide-bandpass filter, and a narrow-bandpass filter.
- Wherein the optical-thin-film structure is physically adapted to reflect or filter infrared wavelengths in the range of about 1.5 to about 20 microns.
- Wherein the at least one low-index optical thin film and the at least one high-index optical thin film function as a partially reflective mirror.
- Wherein the optical-thin-film structure comprises plural low-index optical thin films and plural high-index optical thin films, the low-index and high-index optical thin films alternating with one another and defining two partially reflective mirrors that are spaced apart from one another forming an optically resonant cavity in a region therebetween.
- Wherein the optically resonant cavity comprises a low-index material.
- Wherein the optically resonant cavity comprises a high-index material.
- Wherein the optically resonant cavity comprises a gas.
- Wherein the optically resonant cavity comprises a gas under partial vacuum.
- Wherein an interfacial layer is disposed between at least some of the alternating optical thin films, the interfacial layer having a thickness in a range of about 0.1 to about 200 nanometers and comprising a material different than the low-index material and the high-index material.
- Wherein the interfacial layer comprises a material selected from the group consisting of ZnS, ZnSe, $HfO_2$, $Y_2O_3$, and $Al_2O_3$.
- Wherein a first optical-thin-film structure is disposed on a first surface of a substrate, and a second optical-thin-film structure is disposed on a second surface of the substrate, wherein at least one of optical-thin-film structures includes a low-index optical thin film consisting essentially of Barium fluoride and at least one secondary fluoride compound.
- Wherein the Barium fluoride and the secondary fluoride compound are co-evaporated to form a low-index optical thin film.
- Wherein during formation of a low-index optical thin film, the temperature is maintained at less than 100° C.
- Wherein during formation of a low-index optical thin film, the temperature is maintained at less than 50° C.
- Wherein during formation of a low-index optical thin film, the temperature is maintained at 25° C. or less.

Other than in the examples, or where otherwise indicated, all numbers expressing, for example, quantities of ingredients used in the specification and in the claims are to be understood as being modified in all instances by the term "about." Accordingly, unless indicated to the contrary, the numerical parameters set forth in the following specification and attached claims are understood to be approximations that may vary depending upon the desired properties to be obtained in ways that will be understood by those skilled in the art. Generally, this means a variation of at least +/−15%.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10.

It is to be understood that the disclosure describes a few embodiments and that many variations of the invention can easily be devised by those skilled in the art after reading this disclosure and that the scope of the present invention is to be determined by the following claims.

What is claimed:

1. An article comprising a first optical-thin-film structure for operation at wavelengths in mid-IR range, wherein the first optical-thin-film structure comprises alternating optical thin films of low-index material and high index material, the low-index material having a refractive index less than 1.7, and the high-index material having a refractive index of at least about 1.7, wherein at least one of the optical thin films of low-index material consists essentially of a mixture of:

(a) Barium Fluoride in an amount between about 75 to about 99 weight percent; and (b) at least one fluoride compound other than Barium Fluoride, wherein the other fluoride compound:

(i) is suitable, when co-deposited with the Barium Fluoride, for reducing an average crystal size of the optical thin film of low-index material relative to an average crystal size of a low-index optical thin film consisting of 100 percent by weight of Barium Fluoride; and (ii) possesses suitable optical properties and chemical stability for an intended use of the article.

2. The article of claim 1 wherein the at least one other fluoride compound is selected from the group consisting of $CaF_2$, $AlF_3$, $YF_3$, and $YbF_3$.

3. The article of claim 1 wherein the at least one other fluoride compound is selected from the group consisting of $CaF_2$, $AlF_3$, $YF_3$, $YbF_3$, $CeF_3$, $ThF_4$, NaF, LiF, KF, $SrF_2$, and $MgF_2$.

4. The article of claim 1 wherein at least one of the optical thin films of low-index material consists of Barium Fluoride in an amount within a range of about 85 to about 99 weight percent.

5. The article of claim 1 wherein at least one of the optical thin films of low-index material consists essentially of Barium Fluoride in an amount of 95 percent by weight and Aluminum Fluoride in an amount of 5 percent by weight.

6. The article of claim 1 wherein at least one of the optical thin films of low-index material consists essentially of Barium Fluoride in an amount of 99 percent by weight and Aluminum Fluoride in an amount of 1 percent by weight.

7. The article of claim 1 wherein at least one of optical thin films of low-index material consists essentially of Barium Fluoride in an amount in a range of about 85 to about 99 percent by weight, and Ytterbium Fluoride in an amount in a range of about 1 to about 15 percent by weight.

8. The article of claim 1 wherein at least one of the optical thin films of high-index material comprises a material selected from the group consisting of Ge, Si, ZnS, and ZnSe.

9. The article of claim 1 wherein the article is operable in a range of wavelengths from 1.5 microns to 20 microns.

10. The article of claim 9 wherein the article is selected from the group consisting of an antireflection coating, a high-reflection coating, a long-wavelength-pass filter, a short-wavelength-pass filter, a wide-bandpass filter, and a narrow-bandpass filter.

11. The article of claim 1 wherein the alternating optical thin films of low-index material and high index material define two partially reflective mirrors, wherein the two partially reflective mirrors are spaced apart forming an optically resonant cavity in a region therebetween.

12. The article of claim 11 wherein the region contains a gas.

13. The article of claim 11 wherein the region is under partial vacuum.

14. The article of claim 11 wherein the region comprises a low-index material.

15. The article of claim 1 wherein an interfacial layer is disposed between at least some of the alternating optical thin films, the interfacial layer having a thickness in a range of about 0.1 to about 200 nanometers and comprising a material different than the low-index material and the high-index material.

16. The article of claim 15 wherein the interfacial layer comprises a material selected from the group consisting of ZnS, ZnSe, $HfO_2$, $Y_2O_3$, and $Al_2O_3$.

17. The article of claim 1 comprising a substrate, wherein the first optical-thin-film structure is disposed on a first surface of the substrate.

18. The article of claim 17 comprising a second optical-thin-film structure disposed on a second surface of the substrate.

19. An article comprising an optical-thin-film structure, wherein the optical-thin-film structure comprises an optical thin film consisting essentially of low-index material and an optical thin film consisting essentially of high-index material, one of the optical thin films disposed above the other optical thin film, wherein the low-index material has a refractive index less than about 1.7, and the high-index material having a refractive index of at least about 1.7, wherein the low-index material consists essentially of a mixture of:

(a) Barium Fluoride in an amount within a range of about 85 to about 99 weight percent; and (b) at least one fluoride compound other than Barium Fluoride, wherein the other fluoride compound:

(i) is suitable, when co-deposited with Barium Fluoride, for reducing an average crystal size of the optical thin film of low-index material relative to an average crystal size of an optical thin film consisting of 100 percent by weight of Barium Fluoride; and (ii) possesses suitable optical properties and chemical stability for an intended use of the article.

20. The article of claim 19 wherein the at least one other fluoride compound is selected from the group consisting of $CaF_2$, $AlF_3$, $YF_3$, and $YbF_3$.

21. An article comprising a first optical-thin-film structure for operation at wavelengths in mid-IR range, wherein the first optical-thin-film structure comprises alternating optical thin films of low-index material and high index material, the low-index material having a refractive index less than 1.7, and the high-index material having a refractive index of at least about 1.7, wherein:

(a) the alternating optical thin films of low-index material and high index material define two partially reflective mirrors, wherein the two partially reflective mirrors are spaced apart forming an optically resonant cavity in a region therebetween; and (b) at least one of the optical thin films of low-index material consists essentially of a mixture of:

(i) Barium Fluoride in an amount between about 75 to about 99 weight percent; and (ii) at least one fluoride compound other than Barium Fluoride, wherein the other fluoride compound is suitable, when co-deposited with the Barium Fluoride, for reducing an average crystal size of the optical thin film of low-index material relative to an average crystal size of a low-index optical thin film consisting of 100 percent by weight of Barium Fluoride.

22. The article of claim 21 wherein the region contains a gas.

23. The article of claim 21 wherein the region is under partial vacuum.

24. The article of claim 21 wherein the region comprises a low-index material.

25. The article of claim 21 wherein the at least one fluoride compound is selected from the group consisting of $CaF_2$, $AlF_3$, $YF_3$, and $YbF_3$.

* * * * *